(12) United States Patent
Zeng

(10) Patent No.: US 10,552,681 B2
(45) Date of Patent: *Feb. 4, 2020

(54) USER LOCATION DETERMINATION BASED ON AUGMENTED REALITY

(71) Applicant: Alibaba Group Holding Limited, George Town (KY)

(72) Inventor: Xiaodong Zeng, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/295,840

(22) Filed: Mar. 7, 2019

(65) Prior Publication Data

US 2019/0205648 A1 Jul. 4, 2019

Related U.S. Application Data

(63) Continuation of application No. 15/792,611, filed on Oct. 24, 2017, now Pat. No. 10,235,569.

(30) Foreign Application Priority Data

Oct. 26, 2016 (CN) .......................... 2016 1 0950767

(51) Int. Cl.
*G06K 9/00* (2006.01)
*G06K 9/64* (2006.01)
(Continued)

(52) U.S. Cl.
CPC ..... *G06K 9/00677* (2013.01); *G02B 27/0172* (2013.01); *G06K 9/00671* (2013.01);
(Continued)

(58) Field of Classification Search
CPC .. G06K 9/00677; G06K 9/64; G06K 9/00671; H04W 4/023; G02B 27/0172; G02B 2027/0138
See application file for complete search history.

(56) References Cited

U.S. PATENT DOCUMENTS 8,131,118 B1 3/2012 Jing et al.
8,249,302 B2 8/2012 Ramalingam et al.
(Continued)

FOREIGN PATENT DOCUMENTS

CN 102958114 3/2013
CN 103398717 11/2013
(Continued)

OTHER PUBLICATIONS

International Search Report and Written Opinion of the International Searching Authority issued in International Application No. PCT/US2017/058542 dated Jan. 4, 2018; 8 pages.
(Continued)

*Primary Examiner* — Adnan Aziz
(74) *Attorney, Agent, or Firm* — Fish & Richardson P.C.

(57) ABSTRACT

An augmented reality (AR) client terminal identifies initial location information for a location of a user. A scene picture associated with the location of the user is captured. Image matching is performed between the captured scene picture and scene pictures in a scene picture set. The scene picture set is generated based on the initial location information. Each scene picture in the scene picture set is associated with detailed location information. In response to the captured scene picture matching a particular scene picture in the scene picture set, refined location information for the location of the user is determined based on the detailed location information of the particular scene picture.

17 Claims, 5 Drawing Sheets

(51) Int. Cl.
*H04W 4/02* (2018.01)
*G02B 27/01* (2006.01)

(52) U.S. Cl.
CPC .............. *G06K 9/64* (2013.01); *H04W 4/023* (2013.01); *G02B 2027/0138* (2013.01)

(56) References Cited

U.S. PATENT DOCUMENTS

| | | | |
|---|---|---|---|
| 8,493,206 B2 | 7/2013 | Richey et al. | |
| 8,519,844 B2 | 8/2013 | Richey et al. | |
| 8,644,859 B2 | 2/2014 | Hyung et al. | |
| 9,122,391 B2* | 9/2015 | Lee | G06F 3/011 |
| 9,524,580 B2* | 12/2016 | Katz | G02B 27/017 |
| 9,573,064 B2 | 2/2017 | Kinnebrew et al. | |
| 9,609,288 B1 | 3/2017 | Richman et al. | |
| 10,102,680 B2* | 10/2018 | Jurgenson | G06T 19/006 |
| 10,235,569 B2 | 3/2019 | Zeng | |
| 2008/0268876 A1* | 10/2008 | Gelfand | G06Q 30/02 455/457 |
| 2009/0228204 A1 | 9/2009 | Zavoli et al. | |
| 2010/0225665 A1 | 9/2010 | Ofek et al. | |
| 2010/0329542 A1 | 12/2010 | Ramalingam et al. | |
| 2011/0153310 A1 | 6/2011 | Ehlen et al. | |
| 2011/0279453 A1 | 11/2011 | Murphy et al. | |
| 2012/0025974 A1 | 2/2012 | Richey et al. | |
| 2012/0088526 A1 | 4/2012 | Lindner | |
| 2012/0148091 A1 | 6/2012 | Kansai et al. | |
| 2012/0190455 A1 | 7/2012 | Briggs | |
| 2014/0344062 A1 | 11/2014 | LaMont | |
| 2015/0109338 A1 | 4/2015 | McKinnon et al. | |
| 2015/0193982 A1 | 7/2015 | Mihelich et al. | |
| 2015/0237481 A1 | 8/2015 | Ben-Moshe et al. | |
| 2015/0371440 A1 | 12/2015 | Pirchheim et al. | |
| 2016/0012643 A1* | 1/2016 | Kezele | G02B 27/0172 345/633 |
| 2016/0163113 A1 | 6/2016 | Lyons et al. | |
| 2016/0217543 A1 | 7/2016 | Chao et al. | |
| 2017/0124713 A1 | 5/2017 | Jurgenson et al. | |
| 2017/0161280 A1 | 6/2017 | Almas et al. | |
| 2017/0256097 A1 | 9/2017 | Finn et al. | |
| 2018/0114065 A1 | 4/2018 | Zeng | |

FOREIGN PATENT DOCUMENTS

| | | |
|---|---|---|
| CN | 103424113 | 12/2013 |
| CN | 104748738 | 7/2015 |

OTHER PUBLICATIONS

International Preliminary Report on Patentability in International Application No. PCT/US2017/058542, dated Dec. 26, 2018, 12 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

* cited by examiner

USER LOCATION DETERMINATION BASED ON AUGMENTED REALITY

This application is a continuation of U.S. application Ser. No. 15/792,611, filed on Oct. 24, 2017, which claims priority to Chinese Patent Application No. 201610950767.X, filed on Oct. 26, 2016, the entire contents of which are incorporated by reference.

BACKGROUND

Augmented reality (AR) technology augments an image of a real-world environment (reality) by superimposing supplemental information (such as, pictures, videos, three-dimensional (3D) models, and other sensory enhancements) onto the real-word environment. The AR technology overlays virtual objects onto the image of the real world, enhancing a user's perception of reality and providing a user with an immersive, interactive experience.

SUMMARY

The present disclosure describes user location determination based on augmented reality (AR).

In an implementation, an AR client terminal identifies initial location information for a location of a user. A scene picture associated with the location of the user is captured. Image matching is performed between the captured scene picture and scene pictures in a scene picture set. The scene picture set is generated based on the initial location information. Each scene picture in the scene picture set is associated with detailed location information. In response to the captured scene picture matching a particular scene picture in the scene picture set, refined location information for the location of the user is determined based on the detailed location information of the particular scene picture.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, the described approach uses an AR technology to determine an accurate or refined location information for a user. The accurate or refined location information includes not only planar location information but also elevation information, for example, on which floor of a multistory building the user is located. Second, the described approach enables a location-based-service (LBS) to precisely deliver service information to target users based on the accurate or refined location information, hence improving online-to-offline (O2O) service experience for users. For example, instead of sending merchant promotion information to all users in a multistory shopping mall, the LBS can send promotion information of merchants on a particular floor to those users on the same floor. As a result, telecommunication network bandwidth can be saved by sending information to a reduced number of users. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent from the Detailed Description, the Claims, and the accompanying drawings.

DESCRIPTION OF DRAWINGS

Like reference numbers and designations in the various drawings indicate like elements.

DETAILED DESCRIPTION

Figure 1:
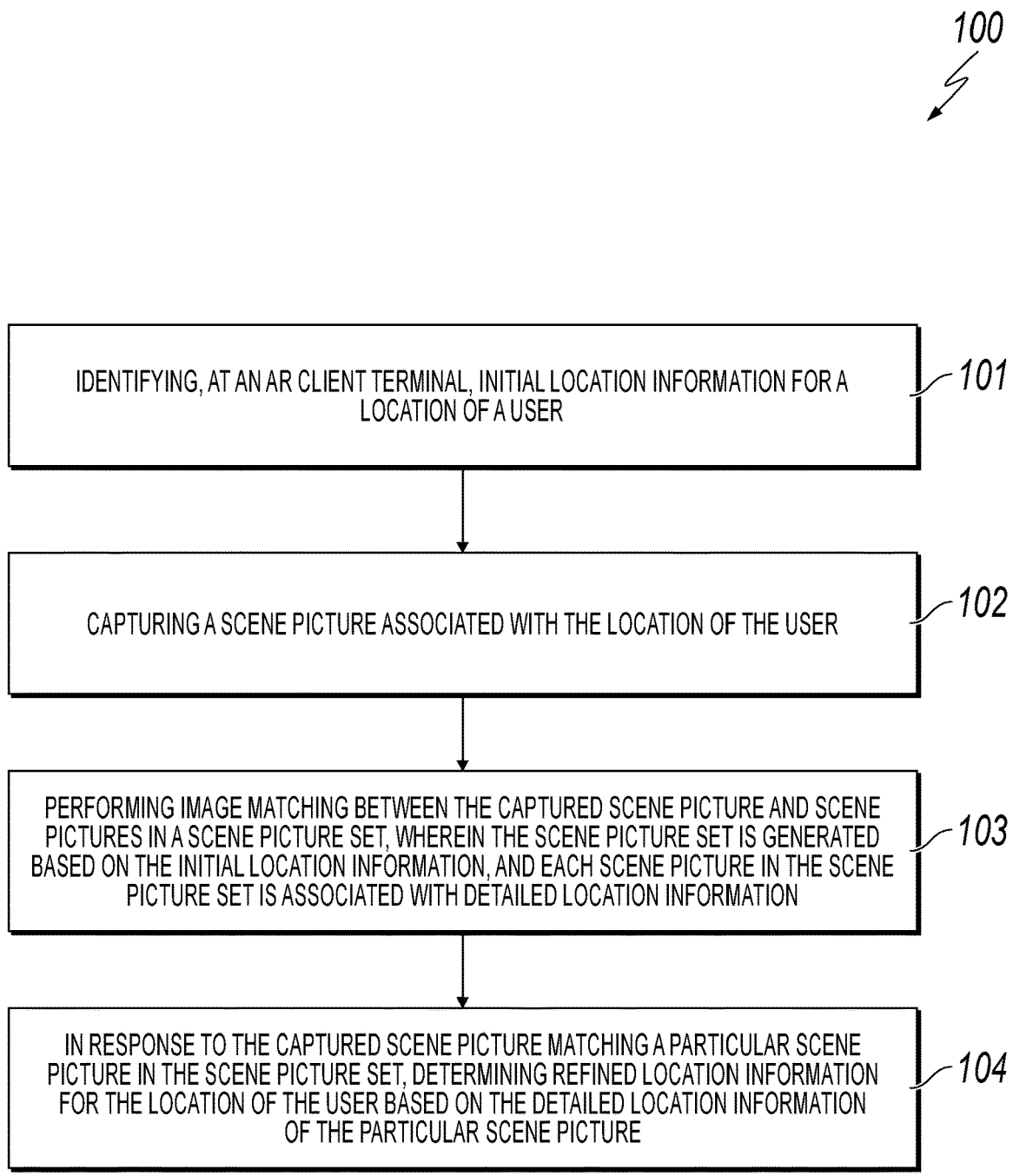
FIG. 1 is a flowchart illustrating an example of a computer-implemented method for user location determination based on augmented reality (AR), according to an implementation of the present disclosure.

The following detailed description describes user location determination based on augmented reality (AR), and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined can be applied to other implementations and applications, without departing from the scope of the present disclosure. In some instances, details unnecessary to obtain an understanding of the described subject matter can be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

AR technology augments an image of a real-world environment (reality) by superimposing supplemental information (such as, pictures, videos, three-dimensional (3D) models, and other sensory enhancements) onto the real-word environment. The AR technology overlays virtual objects onto the image of the real world, enhancing a user's perception of reality and providing a user with an immersive, interactive experience.

A location-based-service (LBS) provides information or services based on a user's current location. The user's real-time location (for example, geographic coordinates or terrestrial coordinates) can be acquired by the user's mobile terminal through a telecommunication operator's wireless communications network (for example, a Global System for Mobile communication (GSM) or a Code Division Multiple Access (CDMA) network) or through a positioning component (for example, a Global Positioning System (GPS) receiver). Based on the user's current location, a server terminal supporting LBS (also called LBS server terminal) can push surrounding service information, such as promotional information of surrounding merchants, to the user.

Accurate user location information is important for an LBS to precisely push service information to target users. However, the existing positioning methods, such as using a wireless communications network or GPS, may not provide accurate location information due to external environmental factors, such as surrounding buildings obstructing wireless signals used for positioning. In particular, the existing positioning methods only provide planar location information, not elevation information. For example, if a user is in a multistory building such as a multistory shopping mall, the existing positioning methods cannot not determine on which floor the user is located. In some cases, the elevation information is important for an LBS to push promotional information of merchants to users on the same floor as the merchants.

At a high level, the described approach determines accurate or refined location information, including elevation information (such as, floor information) for a user. For example, a database can store scene pictures taken at different floors of a multistory building and from different vantage points. Each picture in the database is marked with detailed location information where the picture was taken, for example, building name, floor information, and the section of the floor. A user can wear an AR terminal, such as AR glasses or an AR headset. The AR terminal can capture a scene picture within the user's field-of-view. In addition, an initial or coarse user location can be determined, for example, using a GPS or a wireless communications network. The coarse user location can include the planar information such as the building location and the building name, but not the floor information. A scene picture set is formed based on the pictures in the database and the coarse user location. For example, based on the building name in the coarse user location, the scene picture set can include all pictures whose detailed location information includes the same building name. Image matching is performed between the scene picture captured by the AR terminal and the pictures in the scene picture set. If the captured scene picture matches a particular picture in the scene picture set, the coarse user location is refined based on the detailed location information of the particular scene picture. In this way, by using the AR technology, refined user location information including the elevation information can be determined through image matching. Based on the refined user location, an LBS server terminal can precisely push service information to users, improving online-to-offline (O2O) service experience for the users.

FIG. 1 is a flowchart illustrating an example of a computer-implemented method 100 for user location determination based on AR, according to an implementation of the present disclosure. For clarity of presentation, the description that follows generally describes method 100 in the context of the other figures in this description. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order.

At 101, an AR client terminal identifies an initial coarse location for a user. For example, the user can wear an AR terminal (such as, AR glasses or an AR headset) and the AR terminal can include an AR client terminal. In some implementations, the AR client terminal can be software or hardware installed on the AR terminal. The AR client terminal can determine the coarse user location using GPS if the AR terminal includes a GPS receiver. In some cases, the coarse user location can be determined by the user's mobile terminal (such as, a smart phone or tablet-type computer) placed in proximity to the AR client terminal. The mobile terminal can determine the coarse user location using GPS or a wireless communications network. The mobile terminal can transmit the determined coarse user location to the AR client terminal. The coarse user location can include planar location information without elevation information. For example, if the user is in a multistory building, the coarse user location can include the location of the building and the building name, but does not indicate on which floor the user is located. From 101, method 100 proceeds to 102.

At 102, the AR client terminal captures a scene picture at the user location. The captured scene picture represents the scene the user sees at the user location. For example, if the user is in the multistory building, the AR client terminal can capture an indoor 360° panoramic picture or other picture. In some implementations, the AR client terminal can capture the scene picture and upload the captured scene picture to a background server terminal in real time.

In some implementations, the AR client terminal can be client software, hardware, or a combination of software and hardware, developed based on AR technology. The AR client terminal can perform image scanning of an environmental scene (for example, image(s) in view of an AR terminal) and transmit the scanned image(s) to the background server terminal in real time. In some cases, the AR client terminal can be installed on the user's mobile terminal.

The background server terminal can be a server, a server cluster, or a cloud platform based on a server cluster. The background server terminal can provide services to the AR client terminal. In some implementations, the background server terminal (or a background AR engine in the background server terminal) can perform image matching between the image scanned by the AR client terminal and scene pictures in a database, and determine a refined user location. The background server terminal can also manage virtual data (for example, promotional information of offline merchants) related to a user location, and push the virtual data to the AR client terminal based on the refined user location. In some cases, the background AR engine in the background server terminal can perform image recognition on the scene picture captured by the AR client terminal. For example, the background server terminal can recognize a particular identifier (for example, a merchant name) in the captured scene picture and push virtual data related to the particular identifier to the AR client terminal. In some cases, the AR client terminal can perform image recognition to recognize identifiers in the scene picture.

In some implementations, the AR client terminal (or a foreground AR engine in the AR client terminal) can create an AR scene model including various identifiers. For example, the AR scene model can be a real-time environmental scene image scanned by the AR client terminal where various identifiers in the image have been recognized by using image recognition techniques. The AR client terminal can perform visualization rendering on the virtual data pushed by the background server terminal. The AR engine can display the virtual data at a position of the corresponding identifier in the AR scene model, and overlay the rendered virtual data on the real-time scanned environmental scene image. For example, the promotional information of a particular merchant can be displayed on top of or around the image of the merchant. The real-time scanned environmental scene picture (used for real-time displaying of AR images) can be different from or same as the scene picture captured at 102. From 102, method 100 proceeds to 103.

At 103, image matching is performed between the scene picture captured by the AR client terminal and pictures in a scene picture set. In some implementations, a database on the background server terminal can store scene pictures taken at different locations or from different vantage points. The scene picture set can include the scene pictures from the database that are related to the coarse user location identified at 101. For example, a large number of indoor scene pictures of a multistory building can be taken by a photographer at different floors of the building and stored in the database. Each picture in the database is marked with detailed location information indicating the location of the photographer when the picture was taken. The detailed location information can include the building name and on which floor the picture was taken. The scene picture set can include all the indoor scene pictures in the database whose detailed location information includes the same building name as that indicated in the coarse user location.

In some implementations, the scene picture set can be stored in the AR client terminal and the image matching is performed by the AR client terminal. For example, the AR client terminal can send the coarse user location to the background server terminal. The AR client terminal can download the scene pictures related to the coarse user location from the database, and form the scene picture set based on the downloaded pictures. The AR client terminal can compare the captured scene picture with each picture in the scene picture set.

In some cases, the coarse user location identified at 101 may include a positioning error due to intrinsic error sources from GPS or the wireless communications network. For compensating the positioning error, the scene picture set can further include pictures related to locations that are within a threshold distance from the coarse user location. For example, the threshold distance can be determined based on the positioning error of the GPS or the wireless communications network. The threshold distance is typically larger than the positioning error of the GPS or the wireless communications network. For example, if the GPS's positioning error is 100 m, the threshold distance is set to be a number larger than 100 m. If the threshold distance is smaller than the GPS's positioning error, the scene picture set may not include a scene picture of a location the user is actually located, resulting in a failure in image matching. The threshold distance can be determined by the AR client terminal, the background server terminal, or the user.

In some implementations, the scene picture set can be stored in the background server terminal and the image matching is performed by the background server terminal. For example, the AR client terminal can report the coarse user location to the background server terminal. After receiving the coarse user location, the background server terminal can search the database for the scene pictures related to the coarse user location. In some cases, the background server terminal can search the database for the scene pictures related to locations that are within the threshold distance from the coarse user location. Based on the searched scene pictures, the background server terminal generates the scene picture set. In addition, the AR client terminal can send the scene picture captured at 102 to the background server terminal in real time. The background server terminal can compare the captured scene picture with each picture in the scene picture set. The coarse user location and the captured scene picture can be reported to the background server in a synchronous (report at the same time) or an asynchronous manner (report at different times).

In some implementations, image matching can be based on comparing image contents. For example, image recognition techniques can be used to identify image contents, such as merchant names shown in a picture of a shopping mall. For instance, image recognition techniques can identify merchant names in the captured scene picture as well as the pictures in the scene picture set. A match is found if the merchant names in the captured scene picture are the same as the merchant names of a picture in the scene picture set. In some cases, a match is found if the merchant names in the captured scene picture are a subset of the merchant names of a picture in the scene picture set, or the merchant names of a picture in the scene picture set is a subset of the merchant names in the captured scene picture. From 103, method 100 proceeds to 104.

At 104, in response to the captured scene picture matching a picture in the scene picture set, the user location is refined based on the detailed location information of the matched scene picture. For example, the coarse user location identified at 101 is refined to include the floor information base on the detailed location of the matched scene picture. If the image matching is performed by the background server terminal, the background server terminal can return the detailed location information of the matched scene picture to the AR client terminal. From 104, method 100 stops.

Figure 2:
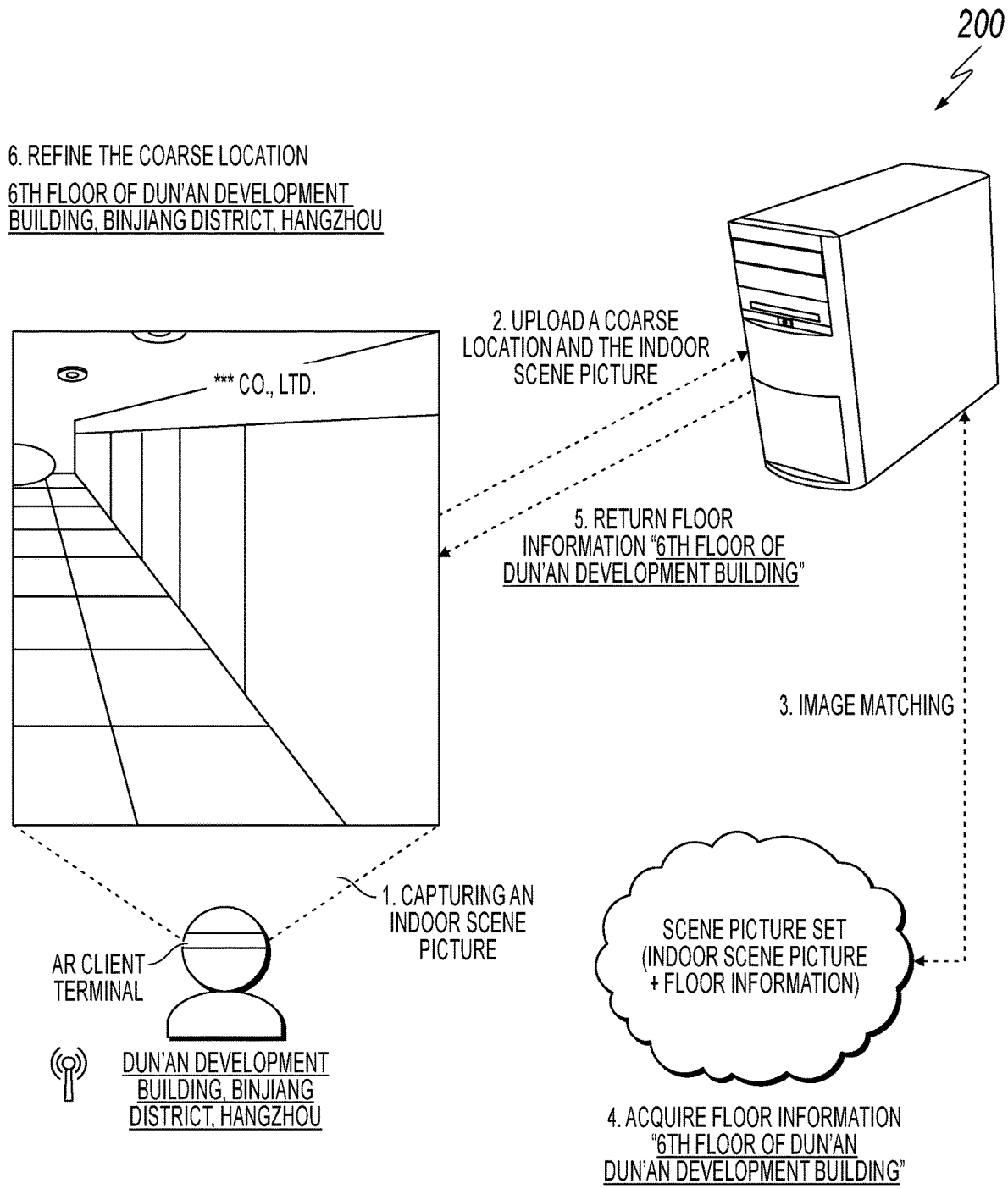
FIG. 2 is a schematic diagram illustrating an example of a use case for user location determination based on AR, according to an implementation of the present disclosure.

FIG. 2 is a schematic diagram illustrating an example of a use case 200 for user location determination based on AR, according to an implementation of the present disclosure. The use case 200 assumes that a user is in a multistory building, and that the user's mobile terminal is in proximity to the user's AR client terminal. By using GPS, the user's mobile terminal determines that the current location of the user is "Dun'an Development Building, Binjiang District, Hangzhou."

At step 1, the user wants to determine a more accurate location including floor information. The user uses the AR client terminal to capture an indoor scene picture within the user's field of view.

At step 2, the AR client terminal transmits, to a background server terminal in real time, the indoor scene picture captured by the AR client terminal and the initial GPS-based location "Dun'an Development Building, Binjiang District, Hangzhou." The background server terminal can have a database storing a large number of indoor scene pictures, for example, taken by photographers. Each picture in the database is marked with the location information including the floor information where the picture was taken. After receiving the initial GPS-based location information from the AR client terminal, the background server terminal generates a scene picture set by selecting the pictures in the database whose location information including "Dun'an Development Building" or "Dun'an Development Building, Binjiang District, Hangzhou." In some cases, the scene picture set can include the pictures in the database whose location are within a certain distance (for example, 100 m) from the initial GPS-based location.

At step 3, the background server terminal performs image matching between the indoor scene picture captured by the AR client terminal and the pictures in the scene picture set.

For example, as discussed previously, the background server terminal can use image recognition techniques to identify image contents and compare image contents of two pictures.

At step 4, the background server terminal determines that that the indoor scene picture from the AR client terminal matches a picture in the scene picture set, and the matched picture is marked as "$6^{th}$ floor of Dun'an Development Building" or "6th floor of Dun'an Development Building, Binjiang District, Hangzhou." Based on the matched picture, the background server terminal determines the floor information for the user, that is, $6^{th}$ floor.

At step 5, the background server terminal returns the floor information to the AR client terminal. For example, the background server terminal returns "$6^{th}$ floor of Dun'an Development Building" or "6th floor of Dun'an Development Building, Binjiang District, Hangzhou" to the AR client terminal.

At step 6, after receiving the floor information from the background server terminal, the AR client terminal refines the initial GPS-based location with the floor information, that is, the initial GPS-based location "Dun'an Development Building, Binjiang District, Hangzhou" is refined to "$6^{th}$ floor of Dun'an Development Building, Binjiang District, Hangzhou."

Based on the refined user location including the floor information, an LBS server terminal can precisely push service information to users. For example, instead of pushing promotional information of merchants on the $6^{th}$ floor of a shopping mall to all users in the mall, the LBS server terminal can push the promotional information to those users on the $6^{th}$ floor. In some cases, the LBS server terminal providing service information can be same as or different from the background server terminal storing scene pictures. If the LBS server terminal is different from the background server terminal, the user's AR client terminal can report the refined user location with the floor information to the LBS server terminal.

After receiving the push message from the LBS server terminal, the AR client terminal can process the virtual data carried in the push message (for example, virtual data includes merchant promotion information), and perform visualization rendering on the virtual data using the foreground AR engine in the AR client terminal. The AR client terminal can overlay the rendered virtual data with a real-time scene picture captured by the AR client terminal within the user's field of view, and display an augmented picture to the user. For example, the real-time scene picture captured by the AR client terminal can be analyzed using image recognition techniques and the merchants in the image are identified. The AR client terminal can overlay corresponding promotion information for each identified merchant.

In some implementations, the refined user location can be used by other applications installed on the AR terminal, or applications on the user's devices that are in proximity to the AR terminal. For example, after determining the refined user location, the AR client terminal can send the refined user location to the user's mobile terminal that is in proximity to the AR client terminal. The refined user location information can be used by applications on the mobile terminal, for example, through an application programming interface (API). For instance, a social application installed on the mobile terminal can invoke an API to receive the refined user location including the floor information and share this refined location to the user's friends in real time. In some cases, a map or navigation application can use the refined user location for a better navigation.

Figure 3:
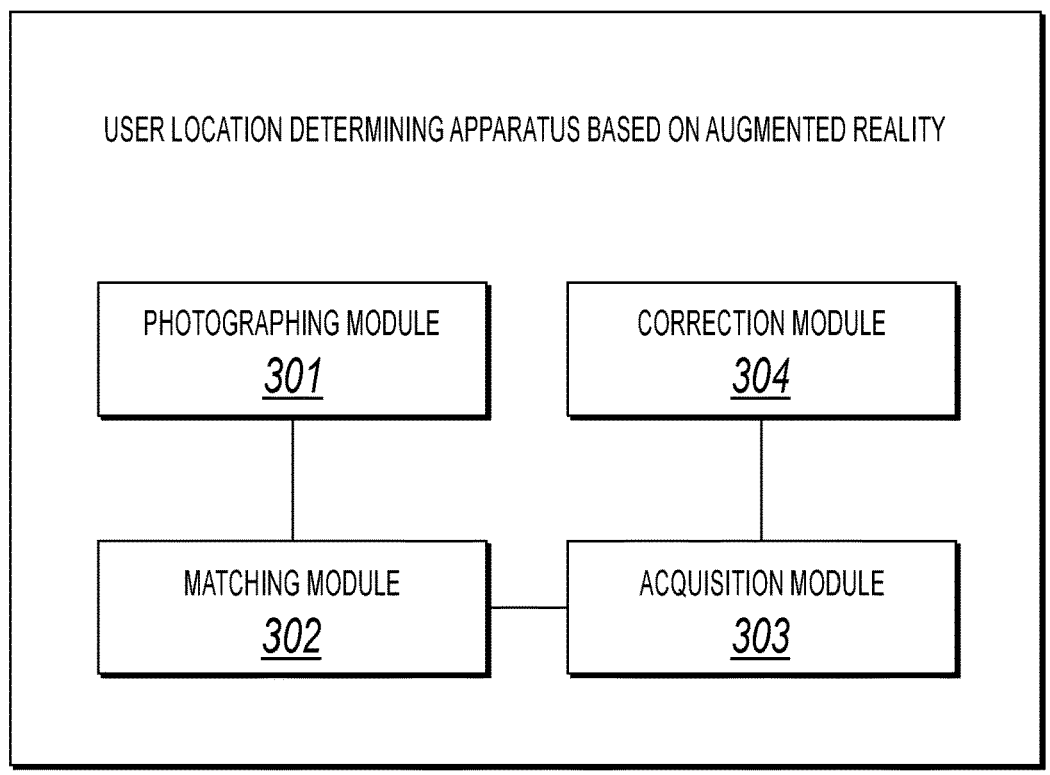
FIG. 3 is a block diagram illustrating an example of an apparatus for user location determination based on AR, according to an implementation of the present disclosure.

FIG. 3 is a block diagram illustrating an example of an apparatus 300 for user location determination based on AR, according to an implementation of the present disclosure. The apparatus 300 can be included in an AR client terminal. The apparatus 300 can include a photographing module 301, a matching module 302, an acquisition module 303, and a correction module 304. The apparatus 300 can be implemented in software, hardware, or a combination of software and hardware.

The photographing module 301 is configured to capture a scene picture within a user's field of view. The matching module 302 is configured to perform image matching between the captured scene picture and pictures in a scene picture set, where each picture in the scene picture set is marked with an accurate location, for example, including floor information. The acquisition module 303 is configured to, in response to the captured scene picture matching a scene picture in the scene picture set, determine the location of the matched picture. The correction module 304 is configured to refine the location for the user based on the location marked for the matched picture in the scene picture set.

In some implementations, the matching module 302 is also configured to identify a coarse location for the user determined by a mobile terminal that is in proximity to the AR client terminal. In cases of the AR client terminal generating the scene picture set, the matching module 302 is further configured to download, from a background server terminal, scene pictures whose locations are within a threshold distance from the coarse user location. The matching module 302 is configured to generate the scene picture set based on the downloaded pictures, and execute image matching between the captured scene picture and each picture in the scene picture set. In cases of the background server terminal generating the scene picture set, the matching module 302 is configured to report the captured scene picture and the coarse user location to the background server terminal so that the background server terminal can generate a scene picture set based on the coarse user location. The background server terminal executes image matching between the captured scene picture and each picture in the scene picture set.

In some implementations, the apparatus 300 also includes an uploading module and a receiving module (not shown in FIG. 3). The uploading module is configured to report the refined location for the user to an LBS server terminal. The receiving module is configured to receive a push message including virtual data from the LBS server terminal.

Figure 4:
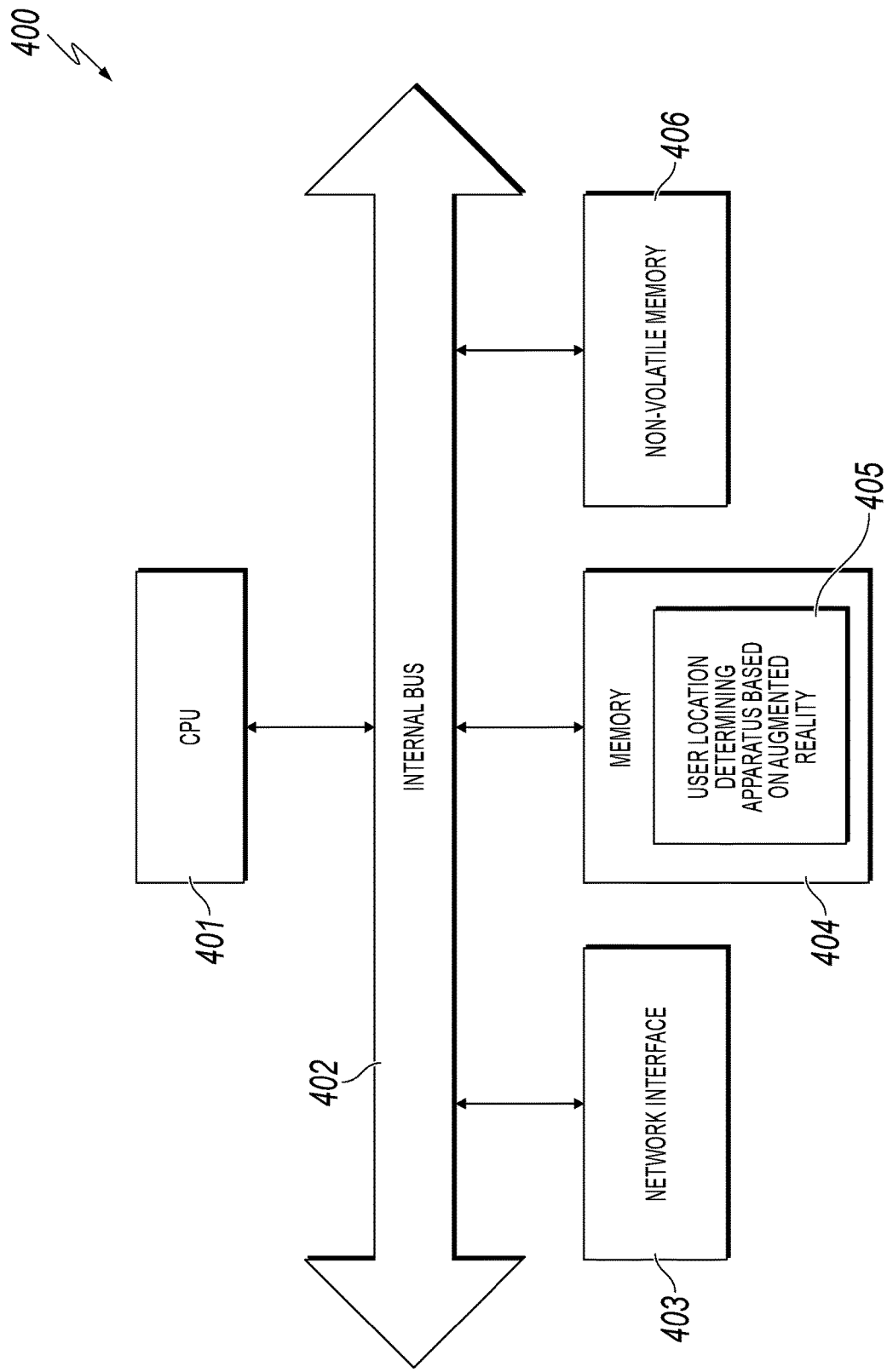
FIG. 4 is a block diagram illustrating an example of a hardware architecture for user location determination based on AR, according to an implementation of the present disclosure.

FIG. 4 is a block diagram illustrating an example of a hardware architecture 400 for user location determination based on AR, according to an implementation of the present disclosure. The hardware architecture 400 can include the apparatus 300 in FIG. 3. The hardware architecture 400 can include a CPU 401, a network interface 403, a memory 404, and a non-volatile storage device 406. The hardware architecture 400 also includes an internal bus 402 connecting the CPU 401, the network interface 403, the memory 404, and the non-volatile storage device 406. The memory 404 can include an apparatus 405 for user location determination based on AR. The apparatus 405 can be the apparatus 300 if the apparatus 300 is implemented in software, and the CPU 401 can execute codes of the apparatus 405 loaded in the memory 404.

Figure 5:
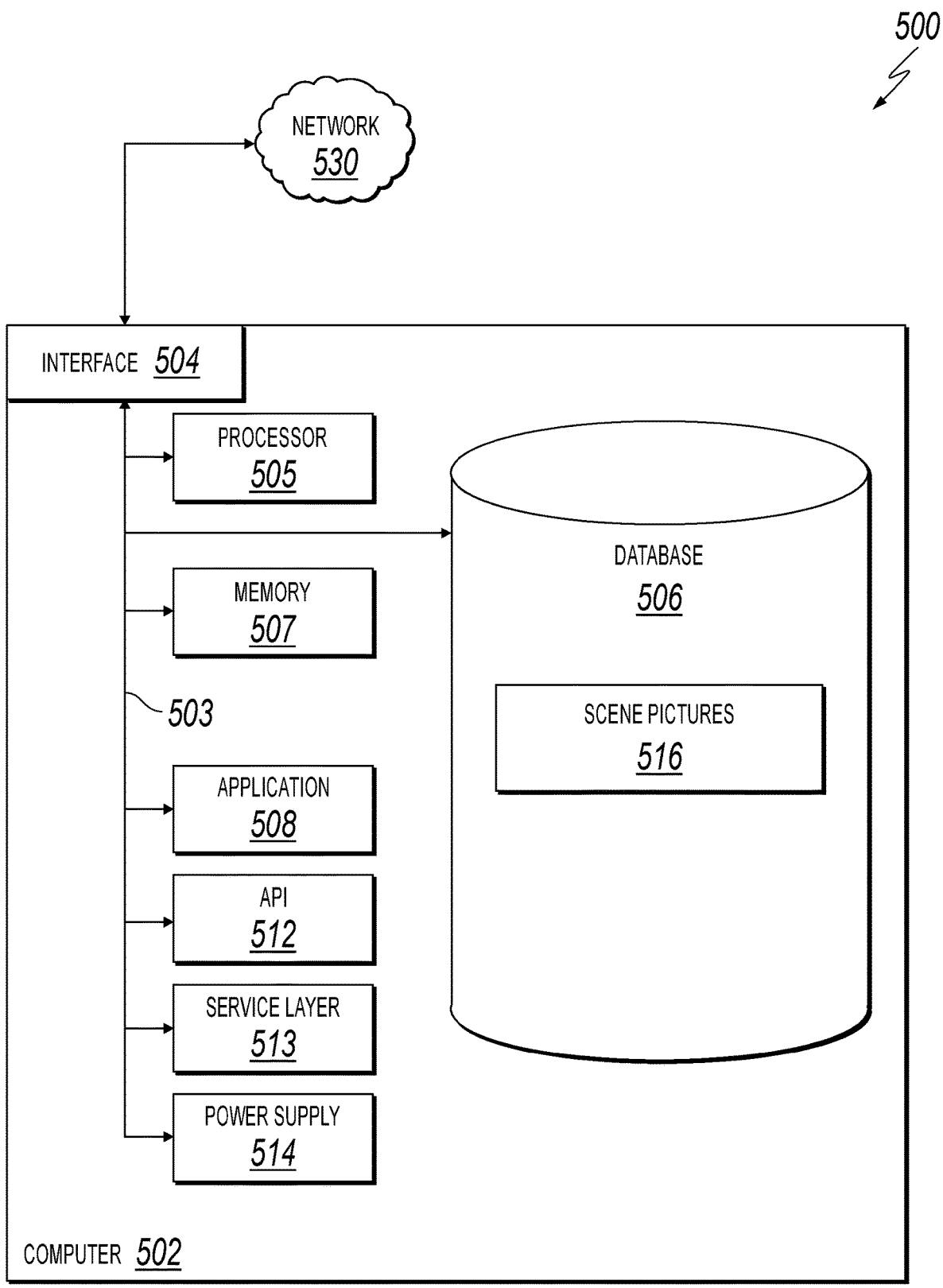
FIG. 5 is a block diagram illustrating an example of a computer-implemented system used to provide computational functionalities associated with described algorithms, methods, functions, processes, flows, and procedures, according to an implementation of the present disclosure.

FIG. 5 is a block diagram illustrating an example of a computer-implemented system 500 used to provide computational functionalities associated with described algorithms, methods, functions, processes, flows, and procedures, according to an implementation of the present disclosure. In the illustrated implementation, system 500 includes a computer 502 and a network 530.

The illustrated computer 502 is intended to encompass any computing device such as a server, desktop computer, laptop/notebook computer, wireless data port, smart phone, personal data assistant (PDA), tablet computing device, AR terminal, one or more processors within these devices, another computing device, or a combination of computing devices, including physical or virtual instances of the computing device, or a combination of physical or virtual instances of the computing device. Additionally, the computer 502 can comprise a computer that includes an input device, such as a keypad, keyboard, touch screen, another input device, or a combination of input devices that can accept user information, and an output device that conveys information associated with the operation of the computer 502, including digital data, visual, audio, another type of information, or a combination of types of information, on a graphical-type user interface (UI) (or GUI) or other UI.

The computer 502 can serve in a role in a distributed computing system as a client, network component, a server, a database or another persistency, another role, or a combination of roles for performing the subject matter described in the present disclosure. The illustrated computer 502 is communicably coupled with a network 530. In some implementations, one or more components of the computer 502 can be configured to operate within an environment, including cloud-computing-based, local, global, another environment, or a combination of environments.

At a high level, the computer 502 is an electronic computing device operable to receive, transmit, process, store, or manage data and information associated with the described subject matter. According to some implementations, the computer 502 can also include or be communicably coupled with a server, including an application server, e-mail server, web server, caching server, streaming data server, another server, or a combination of servers.

The computer 502 can receive requests over network 530 (for example, from a client software application executing on another computer 502) and respond to the received requests by processing the received requests using a software application or a combination of software applications. In addition, requests can also be sent to the computer 502 from internal users (for example, from a command console or by another internal access method), external or third-parties, or other entities, individuals, systems, or computers.

Each of the components of the computer 502 can communicate using a system bus 503. In some implementations, any or all of the components of the computer 502, including hardware, software, or a combination of hardware and software, can interface over the system bus 503 using an API 512, a service layer 513, or a combination of the API 512 and service layer 513. The API 512 can include specifications for routines, data structures, and object classes. The API 512 can be either computer-language independent or dependent and refer to a complete interface, a single function, or even a set of APIs. The service layer 513 provides software services to the computer 502 or other components (whether illustrated or not) that are communicably coupled to the computer 502. The functionality of the computer 502 can be accessible for all service consumers using this service layer. Software services, such as those provided by the service layer 513, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 502, alternative implementations can illustrate the API 512 or the service layer 513 as stand-alone components in relation to other components of the computer 502 or other components (whether illustrated or not) that are communicably coupled to the computer 502. Moreover, any or all parts of the API 512 or the service layer 513 can be implemented as a child or a sub-module of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502. The interface 504 is used by the computer 502 for communicating with another computing system (whether illustrated or not) that is communicatively linked to the network 530 in a distributed environment. Generally, the interface 504 is operable to communicate with the network 530 and comprises logic encoded in software, hardware, or a combination of software and hardware. More specifically, the interface 504 can comprise software supporting one or more communication protocols associated with communications such that the network 530 or interface's hardware is operable to communicate physical signals within and outside of the illustrated computer 502.

The computer 502 includes a processor 505. Although illustrated as a single processor 505 in FIG. 5, two or more processors can be used according to particular needs, desires, or particular implementations of the computer 502. Generally, the processor 505 executes instructions and manipulates data to perform the operations of the computer 502 and any algorithms, methods, functions, processes, flows, and procedures as described in the present disclosure.

The computer 502 also includes a database 506 that can hold data for the computer 502, another component communicatively linked to the network 530 (whether illustrated or not), or a combination of the computer 502 and another component. For example, database 506 can be an in-memory, conventional, or another type of database storing data consistent with the present disclosure. In some implementations, database 506 can be a combination of two or more different database types (for example, a hybrid in-memory and conventional database) according to particular needs, desires, or particular implementations of the computer 502 and the described functionality. Although illustrated as a single database 506 in FIG. 5, two or more databases of similar or differing types can be used according to particular needs, desires, or particular implementations of the computer 502 and the described functionality. While database 506 is illustrated as an integral component of the computer 502, in alternative implementations, database 506 can be external to the computer 502. As illustrated, the database 506 holds the previously described scene pictures 516.

The computer 502 also includes a memory 507 that can hold data for the computer 502, another component or components communicatively linked to the network 530 (whether illustrated or not), or a combination of the computer 502 and another component. Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 or similar or differing types can be used according to particular needs, desires, or particular implementations of the computer 502 and the described functionality. While memory 507 is illustrated as an integral component of the computer 502, in alternative implementations, memory 507 can be external to the computer 502.

The application 508 is an algorithmic software engine providing functionality according to particular needs, desires, or particular implementations of the computer 502, particularly with respect to functionality described in the present disclosure. For example, application 508 can serve as one or more components, modules, or applications. Further, although illustrated as a single application 508, the application 508 can be implemented as multiple applications 508 on the computer 502. In addition, although illustrated as integral to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion or management circuits (including recharging, standby, or another power management functionality). In some implementations, the power-supply 514 can include a power plug to allow the computer 502 to be plugged into a wall socket or another power source to, for example, power the computer 502 or recharge a rechargeable battery.

There can be any number of computers 502 associated with, or external to, a computer system containing computer 502, each computer 502 communicating over network 530. Further, the term "client," "user," or other appropriate terminology can be used interchangeably, as appropriate, without departing from the scope of the present disclosure. Moreover, the present disclosure contemplates that many users can use one computer 502, or that one user can use multiple computers 502.

Described implementations of the subject matter can include one or more features, alone or in combination.

For example, in a first implementation, a computer-implemented method, comprising: identifying, at an AR client terminal, initial location information for a location of a user; capturing a scene picture associated with the location of the user; performing image matching between the captured scene picture and scene pictures in a scene picture set, wherein the scene picture set is generated based on the initial location information, and each scene picture in the scene picture set is associated with detailed location information; and in response to the captured scene picture matching a particular scene picture in the scene picture set, determining refined location information for the location of the user based on the detailed location information of the particular scene picture.

The foregoing and other described implementations can each, optionally, include one or more of the following features:

A first feature, combinable with any of the following features, wherein the initial location information represents planar location information, and the refined location information includes elevation information.

A second feature, combinable with any of the previous or following features, wherein the initial location information is generated using GPS of a mobile terminal in proximity to the AR client terminal.

A third feature, combinable with any of the previous or following features, wherein the AR client terminal reports the initial location information to a background server terminal.

A fourth feature, combinable with any of the previous or following features, wherein the AR client terminal downloads the scene picture set from the background server terminal based on the initial location information.

A fifth feature, combinable with any of the previous or following features, further comprising: reporting the refined location information to an LBS server terminal; and receiving a push message including virtual data from the LBS server terminal based on the refined location information.

A sixth feature, combinable with any of the previous or following features, wherein the AR client terminal displays an augmented scene picture to the user by combining the virtual data in the push message and a real-time scene picture scanned by the AR client terminal.

In a second implementation, a non-transitory, computer-readable medium storing one or more instructions executable by a computer system to perform operations comprising: identifying, at an AR client terminal, initial location information for a location of a user; capturing a scene picture associated with the location of the user; performing image matching between the captured scene picture and scene pictures in a scene picture set, wherein the scene picture set is generated based on the initial location information, and each scene picture in the scene picture set is associated with detailed location information; and in response to the captured scene picture matching a particular scene picture in the scene picture set, determining refined location information for the location of the user based on the detailed location information of the particular scene picture.

The foregoing and other described implementations can each, optionally, include one or more of the following features:

A first feature, combinable with any of the following features, wherein the initial location information represents planar location information, and the refined location information includes elevation information.

A second feature, combinable with any of the previous or following features, wherein the initial location information is generated using GPS of a mobile terminal in proximity to the AR client terminal.

A third feature, combinable with any of the previous or following features, wherein the AR client terminal reports the initial location information to a background server terminal.

A fourth feature, combinable with any of the previous or following features, wherein the AR client terminal downloads the scene picture set from the background server terminal based on the initial location information.

A fifth feature, combinable with any of the previous or following features, wherein the operations further comprise: reporting the refined location information to an LBS server terminal; and receiving a push message including virtual data from the LBS server terminal based on the refined location information.

A sixth feature, combinable with any of the previous or following features, wherein the AR client terminal displays an augmented scene picture to the user by combining the virtual data in the push message and a real-time scene picture scanned by the AR client terminal.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: identifying, at an AR client terminal, initial location information for a location of a user; capturing a scene picture associated with the location of the user; performing image matching between the captured scene picture and scene pictures in a scene picture set, wherein the scene picture set is generated based on the initial location information, and each scene picture in the scene picture set is associated with detailed location information; and in response to the captured scene picture matching a particular scene picture in the scene picture set, determining refined location information for the location of the user based on the detailed location information of the particular scene picture.

The foregoing and other described implementations can each, optionally, include one or more of the following features:

A first feature, combinable with any of the following features, wherein the initial location information represents planar location information, and the refined location information includes elevation information.

A second feature, combinable with any of the previous or following features, wherein the initial location information is generated using GPS of a mobile terminal in proximity to the AR client terminal.

A third feature, combinable with any of the previous or following features, wherein the AR client terminal reports the initial location information to a background server terminal.

A fourth feature, combinable with any of the previous or following features, wherein the AR client terminal downloads the scene picture set from the background server terminal based on the initial location information.

A fifth feature, combinable with any of the previous or following features, wherein the one or more operations further comprise: reporting the refined location information to an LBS server terminal; and receiving a push message including virtual data from the LBS server terminal based on the refined location information.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   capturing a scene picture viewed by a user at a location indicated by initial location information;
   determining a threshold distance from the location indicated by the initial location;
   determining that the threshold distance is smaller than a positioning error associated with a system used to indicate the initial location information;
   in response to determining that the threshold distance is smaller than the positioning error, adjusting the threshold distance;
   performing image matching between the captured scene picture and scene pictures of a scene picture set, each scene picture of the scene picture set being associated with detailed location information that satisfies the threshold distance;
   determining, in response to the image matching, refined location information of the user based upon the detailed location information of a particular one of the scene pictures of the scene picture set;
   generating virtual data associated with a refined location indicated by the refined location information; and
   overlaying the virtual data with a real-time scene picture within a field of view of the user at the vantage point of the user at the refined location.

2. The computer-implemented method of claim 1, wherein the initial location information includes a street-level location of a multi-floor building and the refined location information includes a particular floor location of the multi-floor building.

3. The computer-implemented method of claim 1, further comprising:
   transmitting the refined location information to a mobile device in proximity with the location of the user; and
   sharing the refined location information with one or more electronic devices associated with the mobile device.

4. The computer-implemented method of claim 1, wherein the detailed location information comprises location information of a particular floor of a multi-floored building.

5. The computer-implemented method of claim 1, wherein performing the image matching between the captured scene picture and the scene pictures of a scene picture set comprises image recognition identifying image contents of the captured scene picture and image contents of the scene pictures of a scene picture set.

6. The computer-implemented method of claim 1, further comprising:
   determining, in response to the image matching, elevation information associated with the refined location information based upon the detailed location information of the particular one of the scene pictures of the scene picture set.

7. A non-transitory, computer-readable medium storing one or more instructions executable by a computer system to perform operations comprising:
   capturing a scene picture viewed by a user at a location indicated by initial location information;
   determining a threshold distance from the location indicated by the initial location;
   determining that the threshold distance is smaller than a positioning error associated with a system used to indicate the initial location information;
   in response to determining that the threshold distance is smaller than the positioning error, adjusting the threshold distance;
   performing image matching between the captured scene picture and scene pictures of a scene picture set, each scene picture of the scene picture set being associated with detailed location information that satisfies the threshold distance;
   determining, in response to the image matching, refined location information of the user based upon the detailed location information of a particular one of the scene pictures of the scene picture set;
   generating virtual data associated with a refined location indicated by the refined location information; and
   overlaying the virtual data with a real-time scene picture within a field of view of the user at the vantage point of the user at the refined location.

8. The non-transitory, computer-readable medium of claim 7, wherein the initial location information includes a street-level location of a multi-floor building and the refined location information includes a particular floor location of the multi-floor building.

9. The non-transitory, computer-readable medium of claim 7, wherein the operations further comprise:

transmitting the refined location information to a mobile device in proximity with the location of the user; and
sharing the refined location information with one or more electronic devices associated with the mobile device.

10. The non-transitory, computer-readable medium of claim 7, wherein the detailed location information comprises location information of a particular floor of a multi-floored building.

11. The non-transitory, computer-readable medium of claim 7, wherein performing the image matching between the captured scene picture and the scene pictures of a scene picture set comprises an operation for image recognition to identify image contents of the captured scene picture and image contents of the scene pictures of a scene picture set.

12. The non-transitory, computer-readable medium of claim 7, wherein the operations further comprise:
    determining, in response to the image matching, elevation information associated with the refined location information based upon the detailed location information of the particular one of the scene pictures of the scene picture set.

13. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
        capturing a scene picture viewed by a user at a location indicated by initial location information;
        determining a threshold distance from the location indicated by the initial location;
        determining that the threshold distance is smaller than a positioning error associated with a system used to indicate the initial location information;
        in response to determining that the threshold distance is smaller than the positioning error, adjusting the threshold distance;
        performing image matching between the captured scene picture and scene pictures of a scene picture set, each scene picture of the scene picture set being associated with detailed location information that satisfies the threshold distance;
        determining, in response to the image matching, refined location information of the user based upon the detailed location information of a particular one of the scene pictures of the scene picture set;
        generating virtual data associated with a refined location indicated by the refined location information; and
        overlaying the virtual data with a real-time scene picture within a field of view of the user at the vantage point of the user at the refined location.

14. The computer-implemented system of claim 13, wherein the initial location information includes a street-level location of a multi-floor building and the refined location information includes a particular floor location of the multi-floor building.

15. The computer-implemented system of claim 13, wherein the one or more operations further comprise:
    transmitting the refined location information to a mobile device in proximity with the location of the user; and
    sharing the refined location information with one or more electronic devices associated with the mobile device.

16. The computer-implemented system of claim 13, wherein performing the image matching between the captured scene picture and the scene pictures of a scene picture set comprises one or more operations to perform image recognition identifying image contents of the captured scene picture and image contents of the scene pictures of a scene picture set.

17. The computer-implemented system of claim 13, wherein the one or more operations further comprise:
    determining, in response to the image matching, elevation information associated with the refined location information based upon the detailed location information of the particular one of the scene pictures of the scene picture set.

* * * * *